P. O. J. KNUDSEN.
LOCKING DEVICE FOR MOTOR VEHICLES.
APPLICATION FILED DEC. 20, 1918.
1,348,649.
Patented Aug. 3, 1920.
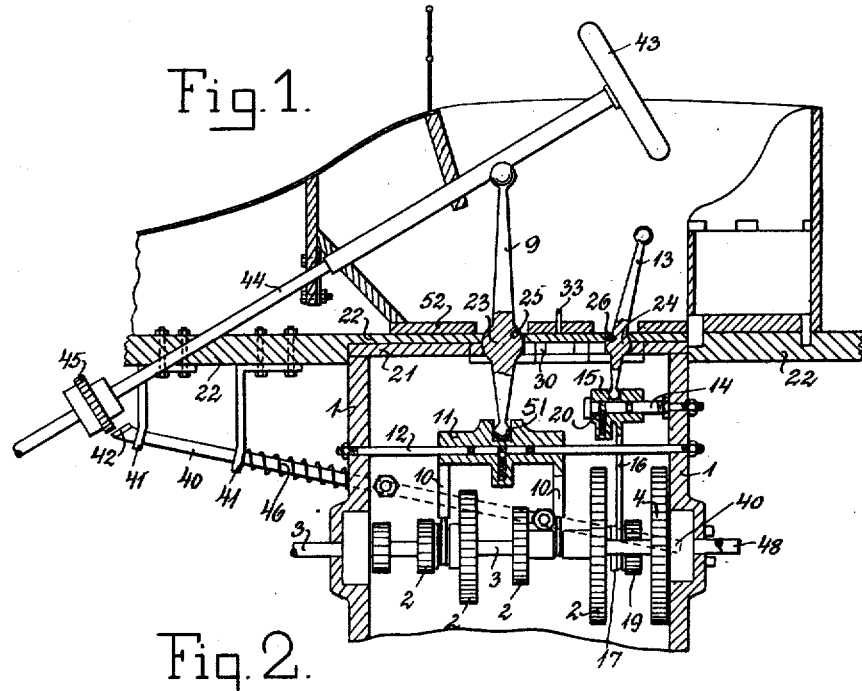
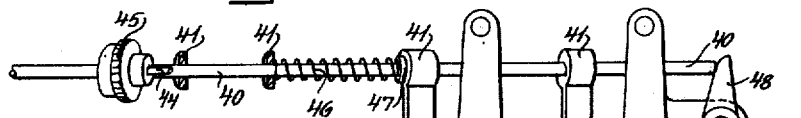
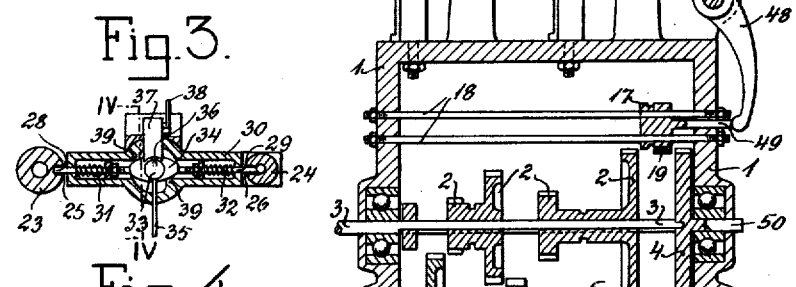
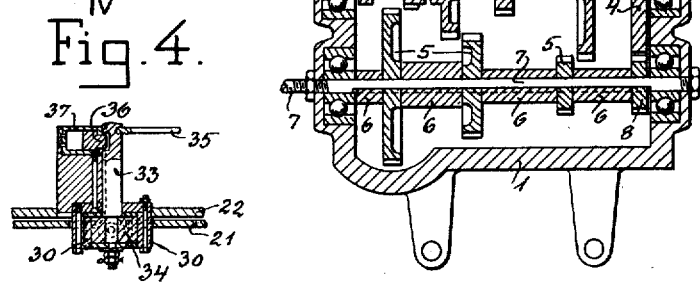
INVENTOR:
Peter Ove Julius Knudsen
By Wm Wallace White
ATTY.

UNITED STATES PATENT OFFICE.

PETER OVE JULIUS KNUDSEN, OF COPENHAGEN, DENMARK.

LOCKING DEVICE FOR MOTOR-VEHICLES.

1,348,649.

Specification of Letters Patent.  Patented Aug. 3, 1920.

Application filed December 20, 1918. Serial No. 267,594.

*To all whom it may concern:*

Be it known that I, PETER OVE JULIUS KNUDSEN, mechanician, a subject of the King of Denmark, residing at Copenhagen, in the Kingdom of Denmark, have invented new and useful Improvements in Locking Devices for Motor-Vehicles, of which the following is a specification.

The present invention relates to an arrangement serving as safeguard against theft of automobiles or similar motor carriages and consists in the provision, in connection with the speed change gear, of a locking device whereby starting of the vehicle by strangers is prevented. In connection with this locking device there may further be provided a device adapted to lock the steering wheel, whereby it is made impossible to steer the vehicle, in case it were attempted to pull the vehicle along. The locking of the steering wheel may, most suitably, be effected after the front wheels have been given a skew position relatively to the vehicle, so that it becomes impossible to move it straight forward.

By way of example one manner of constructing the invention is illustrated on the drawing, where—

Figure 1 shows a vertical section of a portion of an automobile.

Fig. 2 a horizontal section of the speed change gear thereof.

Fig. 3 a horizontal section of the locking device for the speed change gear, and Fig. 4 a vertical section approximately along the line IV—IV of Fig. 3.

Referring to the drawing, 1 is the case wherein the speed change gear of any construction is located. In the construction shown by way of example, the speed change gear consists of gear wheels 2 free to slide on a shaft 3, but connected thereto by tongue and groove, the said shaft being journaled partly in one wall of the case 1 and partly in a central bearing in a gear-wheel 4. The latter is made integral with a pin 50 journaled in the opposite wall of the case 1 and connected, beyond the latter, to the Cardan shaft, which is not shown on the drawing. 5 are gear-wheels and 6 sleeves placed between the gear wheels 5 and serving to maintain the latter in their proper relative position on a shaft 7 in whose rotation they take part. 8 is a gear wheel revolving together with the shaft 7 and engaging the gear-wheel 4. The coupling together of the gear-wheels 2 and the gear-wheels 5 is effected in known manner by a lever 9 and by sleeves 11 fitted with forked arms 10, the sleeves being arranged to slide on the rod 12, Fig. 1, having recesses for a ball lock 51.

The locking of the driving gear is effected by means of a lever 13, Fig. 1, whose lower end is connected by means of a ball lock to a sleeve 15 sliding on rods 14. The sleeve supports an arm 16 forked at bottom and engaging a sleeve 17. The latter may be shifted back and forth on two parallel rods 18, Fig. 2, and supports a hollow toothed sector 19 whose teeth, by the sleeve 17 being moved to the right (on the drawing) may be caused to engage the teeth of the gear-wheel 4, so that the latter cannot rotate any more, whereby also the rotation of shaft 7 is prevented. 20 is a ball lock by means of which the sleeves 17 is held in one of the two positions corresponding to the toothed sector 19 being coupled together with or uncoupled from the gear-wheel 4.

Instead of disposing the sleeve 17 on the rods 18, it may be disposed on the rods 12, if such arrangement is necessary because of limited space in the case 1.

When the toothed sector 19 is coupled to the gear-wheel 4, the lever 9 is adjusted so that the rearmost gear-wheels 2 and 5 come into engagement with one another, whereafter the levers 9 and 13 are locked by means of a special arresting device located on the bottom side of the cover 21 of the case 1 which cover fits tightly against the bottom face of the bottom boards 52 of the carriage frame 22. In the hubs 23 and 24 of the levers 9 and 13 which may, most suitably, be ball-shaped, there are recesses 25 and 26 for bolts 28 and 29, adapted to slide in a lock frame 30, Figs. 1, 3, and 4, and actuated by springs 31 and 32. In the central circular portion of the lock frame 30 there is provided an oblong or cam formed nut 34, rotatable together with a vertical shaft 33, by means of which both bolts 28 and 29 may be moved outward in opposite directions, so that their ends are caused to enter into the recesses 25 and 26 in the hubs 23 and 24, when these recesses are moved in line with the bolts, which will be the case when the levers 9 and 13 are set so that the rearmost gear-wheels 2 and 5 as well as the toothed sector 19 and the gear-wheel 4 are in engagement with one another.

The nut 34 and the shaft 33 supporting the same are turned by means of an arm 35 provided on the shaft. At top, the shaft is formed with a recess for a lock-bolt 36, Fig. 4, of a lock 37 of some suitable kind, which may be operated by a detachable key 38 and which is fixed in such a manner on the cover of the case 1 that the nut 34 may be locked when it is turned at right angle to its normal position by means of the arm 35. After being turned into this position, the nut has moved the lock-bolts 28 and 29 forward, so that their free ends enter into the recesses in the hubs of the levers 9 and 13. The rotation of the nut 34 is limited by stops 39 on the lock-frame 30.

When the levers 9 and 13 are to be released again, the bolt 36 of the lock 37 is withdrawn by means of the key, whereafter the cam nut 34 may again be turned back into its normal position by means of the arm 35, whereby the bolts 28 and 29 are again brought back by their springs.

The arrangement for stopping the steering wheel simultaneously with the locking of the speed change gear consists of a bar 40 placed in guides 41, for instance on the case 1 and on the carriage bottom 22. The front end of the rod is fitted with a tooth 42 adapted to engage a gear-wheel 45 fastened on the shaft or post 44 of the steering wheel 43. The rod 40 may slide in the guides 41, and it is actuated by a helical spring 46 encircling the rod between one of the fixed guides 41 and a preferably adjustable stop 47, for instance a sleeve, provided on the rod, by means of which the tension of the spring may be regulated.

By means of the spring 46, the rear end of the rod 40 is pressed against one end of a lever 48 whose other end rests against a rod 49 extending from the sleeve 17, Fig. 2. When the sleeve 17 is moved to the right on the drawing, then the lever 48 is turned, whereby the rod 40 is moved forward toward the steering shaft 44, so that its tooth is caused to engage the gear-wheel 45. When the sleeve 17 is once more brought back to its normal position, the rod 40 is pulled back by the spring 46, whereby the lever 48 is turned back so that one of its arms is constantly pressed against the end of the rod 49.

The construction described may only be considered as a single example of how the entire arrangement may be constructed. Obviously, the details of the locking device may be modified to suit existing conditions, without the limits of the present invention being thereby passed.

Having now described my invention, what I claim is:—

1. In a motor-driven vehicle having a speed-changing mechanism, a driving gear, and a lever for operating said speed-changing mechanism, the combination of a slidable, nonrotatable toothed sector, a lever for sliding said sector into engagement with said gear, and means for simultaneously locking said levers against operation.

2. In a motor-driven vehicle having a driving gear and a steering post, the combination of a member adapted to engage said gear for locking the same against rotation, a lever for operating said member, and means operable upon the operation of said member to lock the steering post against operation.

3. In a motor-driven vehicle having a speed-changing mechanism, a driving gear, a steering post, and a lever for operating said speed-changing mechanism, the combination of a member adapted to engage said gear for locking the same against rotation, a lever for operating said member, means operable upon the operation of said member to lock the steering post against operation, and means for simultaneously locking said levers in inoperative position.

4. In a motor-driven vehicle having a speed-changing mechanism, a driving gear, a steering post, and a lever for operating said speed-changing mechanism, the combination of a member adapted to engage said gear for locking the same against rotation, a lever for operating said member, means operable upon the operation of said member to lock the steering post against operation, and means for simultaneously locking said levers in inoperative position, said means comprising a rotatable shaft, a cam-member secured to said shaft, and a pair of locking bolts operated by said cam member into engagement with said levers.

5. In a motor-driven vehicle having a speed-changing mechanism, a driving gear, a steering-post, and a lever for operating said speed-changing mechanism, the combination of a member adapted to engage said gear for locking the same against rotation, a lever for operating said member, means operable upon the operation of said member to lock the steering post against operation, and means for simultaneously locking said levers in inoperative position, said means comprising a rotatable shaft, a cam-member secured to said shaft, a pair of locking bolts operated by said cam member into engagement with said levers, means for rotating said shaft, and means for locking the shaft against rotation.

In testimony whereof I have signed my name to this specification in the presence of two subscribing witnesses.

PETER OVE JULIUS KNUDSEN.

Witnesses:
   O. BELSCLUSEN,
   E. WEICFHEN.